United States Patent
Tullis

[11] Patent Number: 6,118,132
[45] Date of Patent: Sep. 12, 2000

[54] SYSTEM FOR MEASURING THE VELOCITY, DISPLACEMENT AND STRAIN ON A MOVING SURFACE OR WEB OF MATERIAL

[75] Inventor: Barclay J. Tullis, Palo Alto, Calif.

[73] Assignee: Agilent Technologies, Palo Alto, Calif.

[21] Appl. No.: 09/154,921

[22] Filed: Sep. 17, 1998

[51] Int. Cl.[7] .................................................. G01B 7/04
[52] U.S. Cl. ...................... 250/559.39; 33/732; 324/206; 250/223 R; 250/208.1; 356/32
[58] Field of Search ................ 250/559.04, 559.26, 250/559.29, 559.39, 223 R, 208.1; 33/732; 116/208, 212; 198/810.01–810.04; 324/206; 356/32, 383

[56] References Cited

U.S. PATENT DOCUMENTS

| | | | |
|---|---|---|---|
| 4,198,758 | 4/1980 | Eineichner et al. | 33/127 |
| 4,274,783 | 6/1981 | Eineichner et al. | 414/134 |
| 4,400,882 | 8/1983 | Thornton | 33/127 |
| 5,089,712 | 2/1992 | Holland | 250/557 |
| 5,149,980 | 9/1992 | Ertel et al. | 250/561 |
| 5,291,131 | 3/1994 | Suzuki et al. | 324/206 |
| 5,567,976 | 10/1996 | Dierschke et al. | 257/443 |
| 5,578,813 | 11/1996 | Allen et al. | 250/208.1 |
| 5,644,139 | 7/1997 | Allen et al. | 250/557 |
| 5,686,720 | 11/1997 | Tullis | 250/208.1 |
| 5,699,161 | 12/1997 | Woodworth | 356/379 |
| 5,703,353 | 12/1997 | Blalock et al. | 250/214 C |
| 5,729,008 | 3/1998 | Blalock et al. | 250/208.1 |
| 5,753,908 | 5/1998 | Christensen | 250/239 |

*Primary Examiner*—Stephone B. Allen

[57] ABSTRACT

The present invention is generally directed to a system and method for calculating the velocity, displacement and/or strain of a moving surface or web of material. ("Surface or web" is hereafter referred to simply as "web".) In accordance with one aspect of the invention, a system is provided having a first photosensor array disposed near the web of material and a second photosensor array disposed near the web of material, wherein the second photosensor array is spaced a distance "d" from the first photosensor array. A processing unit is coupled to both the first photosensor array and the second photosensor array and is configured to control or carry out functional operations and computations associated with the system. In accordance with one embodiment of the present invention, the processing unit is controlled in steps to: (1) detect a pattern on the web of material at the first photosensor array; (2) evaluate a second image pattern taken at the second photosensor array at a predetermined time t2; and (3) compare this position of this second image pattern with that of the first image pattern to compute an offset. In accordance with an alternative embodiment, items (2) and (3) above may be changed to: (2) recognize the detected pattern on the web of material at the second photosensor array; and (3) calculate the strain on the web of material, based on the velocity v of the web of material, the predetermined distance "d" separating the photosensor arrays, and an elapsed time between the detection of the pattern in response to the first step segment and the recognition of the pattern in response to the second step segment.

45 Claims, 6 Drawing Sheets

SYSTEM FOR MEASURING THE VELOCITY, DISPLACEMENT AND STRAIN ON A MOVING SURFACE OR WEB OF MATERIAL

BACKGROUND OF THE INVENTION

1. Field of the Invention

The present invention generally relates to systems having operations synchronized with a moving surface or web of material, and more particularly to a system and method for calculating the velocity, displacement and strain of a moving surface or web of material.

2. Discussion of the Related Art

There are a wide variety of known systems that involve a moving surface or web of material and the need or desire to synchronize operations with the relative movement or positions of the material. Throughout the remainder of this specification, the term "web of material" shall be construed to cover both a web of material that may carry objects thereon (such as a conveyor), as well as the surface of an object that moves relative to the measuring system. In this regard, and for purposes of this disclosure and the present invention, the term "web of material" is to be accorded its broadest reasonable interpretation, in light of the description that follows. By way of illustration, a variety of manufacturing, production, and distribution environments are known that use conveyor systems to transport items thereon. Consider, for example, the system disclosed in U.S. Pat. No. 4,198,758, which was co-invented by the inventor of the present invention. That system disclosed a chain conveyor for transporting a plurality of object carriers. It further disclosed the importance, in such systems, of tracking objects carried on or by the carrier. That system operated by using photo-emitter/detector pairs to measure the length of the chain, segment by segment. Once the length of the conveyor chain between the reference point and the object carrier equaled a known distance along the chain between the reference point (i.e., location of emitter/detector pair) and desired discharge station, then a mechanism was actuated to remove the object from the carrier.

In a significantly different environment, U.S. Pat. No. 5,578,813, assigned to the assignee of the present invention and also co-invented by the inventor of the present invention, discloses a system and method for determining relative movement between a handheld scanner and a web of material (i.e., piece of paper). Specifically, that system utilized an illumination/imaging sensor to detect relative movement between the scanner and the web of material by identifying structure-related properties of the web of material. The inherent structure-related properties of the web (such as paper fibers, or other constituents) were used for navigational purposes. Namely, to identify the navigational path of the scanner, so that the image scanned could be reconstructed electronically.

Another system is disclosed in U.S. Pat. No. 5,291,131, which discloses an apparatus for measuring the elongation of a circulating chain (elongation resulting from component wear or otherwise). The system disclosed therein uses two sensors (e.g., magnetic or optical) disposed a predetermined distance apart along the path of the circulating chain. The distance between the two indices is calculated on the basis of the calculated speed of the moving body and the time which elapse from when a first index passed a first sensor until a second index passed a second sensor. By continuing this observation over time, and comparing the calculated distances, chain elongation can be measured. U.S. Pat. Nos. 4,198,758 and 4,274,783, both entitled "Chain Measuring and Conveyor Control System" and which were coinvented by the inventor of the present invention, disclose similar techniques.

As is also known in the prior art, the print head of some ink jet printers is configured to move across the print width of a sheet of paper. The deposition of ink from the print head to the sheet of paper is closely controlled based in part on positional information of the print head. In some such printers, this positional information is obtained by stretching a transparent web of material across the span covered by the width of the sheet of paper. This web of material is passed through a slot in the print head, and contains periodically-spaced demarcation lines. An optical emitter/detector pair is disposed across the slot, and is configured to count the demarcation lines. By maintaining an accurate count of the demarcation lines, the system can maintain information related to the position of the print head along the sheet of paper. In such a system, the web of material is held stationary (in directions parallel to the direction of print head travel), while the emitter/detector pair (which is fixed to the print head) moves in relation to web of material. As is known, noise or other errors often cause the system to lose proper count of the demarcation lines, resulting in errors in the positional placement of the print head. Mechanisms are also used to track paper fed in the direction orthogonal to the print head travel.

Photocopier machines are yet another example of devices that advance a web of material (e.g., sheets of paper) through a predefined path—e.g., from a feed tray to a discharge tray. To obtain the high resolution images that are desired, the movement of the paper must be very closely controlled, as the image is transferred thereto.

In systems like those mentioned above, as well as other systems, the computation of material velocity, displacement and/or strain is often desired. For example, in such systems the stretch or shrinkage of a moving surface or web, if undetected, may inject errors into position computation. In other systems a mechanism may be provided to properly tension the web of material. Compensation of such a tensioning mechanism may be improved based upon feedback of measured or computed strain borne by the web of material. Although only a few specific examples have been presented above, it will be appreciated that it will be desirable to measure the velocity, displacement and/or strain of a web of material in a wide variety of systems, and to eliminate errors in measuring large displacements which could occur when counting relatively small displacement increments.

In addition to the systems mentioned above, other prior art systems include those disclosed in U.S. Pat. Nos. 5,089,712, 5,149,980, 5,686,720, 5,699,161 5,703,353, 5,729,008, and 5,753,908. These patents, as well as U.S. Pat. Nos. 4,198, 758, 4,274,783, 5,578,813, and 5,291,131, mentioned above are hereby incorporated by reference in their entireties into the present application.

Accordingly, it is desired to provide an apparatus and method that effectively measures the velocity, displacement and/or strain on a moving web of material (or just strain of a generally stationary web of material), and that can measure large displacement of approximate length "d" without otherwise incurring errors from accumulating smaller displacement increments.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the configurations and combinations particularly pointed out in the appended claims.

To achieve the advantages and novel features, the present invention is generally directed to a system and method for calculating the velocity, displacement and/or strain of a moving web of material (or just strain of a stationary web of material). In this regard, the strain is proportional to a stretch or shrinkage in the web of material. In accordance with one aspect of the invention, a system is provided having a first photosensor array disposed near the web of material and a second photosensor array disposed near the web of material, wherein the second photosensor array is separated from the first photosensor array by a predetermined distance "d". A processing unit (e.g., a microprocessor and associated memory and/or other support components) is coupled to both the first photosensor array and the second photosensor array and is configured to control or carry out functional operations and computations associated with the system.

In accordance with a first embodiment of the present invention, a first code segment is configured to control the processing unit to detect a first image pattern at the first photosensor array and define that event as occurring at a time t1. A second code segment is configured to control the processing unit to acquire a second image pattern at the second photosensor array (located a distance "d" away from the first photosensor array in the direction of the travel of the web of material) at a second time t2=d/v, where "v" is the known or measured velocity of the web of material. A third code segment correlates the relative position of the first image pattern with that of the second image pattern to measure any offset "e". The offset "e" identifies a stretch or shrinkage (depending upon whether the offset is positive or negative) of the web of material over the distance "d".

In accordance with a second embodiment of the present invention, a first code segment is configured to control the processing unit to detect a time t1 at which a pattern on the web of material, moving at velocity v, is at the first photosensor array. A second code segment is configured to determine a time t2 later when the processing unit recognizes the detected pattern on the web of material at the second photosensor array, a distance "d" away in the direction of travel, and where t2 is approximately equal to d/v. Finally, a third code segment is configured to control the processing unit to calculate the strain "e" (where e=((t2−t1)/v)−d) on the web of material, based on the known or measured velocity v of the web of material, the predetermined distance "d" separating the photosensor arrays, and a measured elapsed time t2−t1 between the detection of the pattern in response to the first code segment and the recognition of the pattern in response to the second code segment.

In accordance with a third embodiment of the invention, a method is again provided for measuring a strain on a web of material. In accordance with this embodiment of the invention, the method also includes the steps of disposing a first photosensor array along the web of material at a first location and disposing a second photosensor array along the web of material at a second location at a distance "d" from the first photosensor array. The method then correlates image patterns taken at the first and second photosensor arrays at approximately the same time to measure the strain of the web of material as an offset "e" between the relative positions of the patterns in their images, without having to know the velocity of the web of material. Tracking of displacements, however, still utilizes methods as employed in the first two embodiments.

As should be appreciated from the foregoing discussion, the term "moving" as it is used to describe a moving web of material refers to a relative movement between the web of material and the photosensor arrays. The web of material itself (e.g., such as a conveyor system) may be disposed for movement with respect to stationary photosensor arrays. Alternatively, the photosensor arrays (e.g., photosensors of an electro-optical sensing device) may be disposed on a platform that moves in relation to a stationary web of material. In this regard, the term "strain" relates to a measurable change in material elongation (in the form or stretch or shrinkage).

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
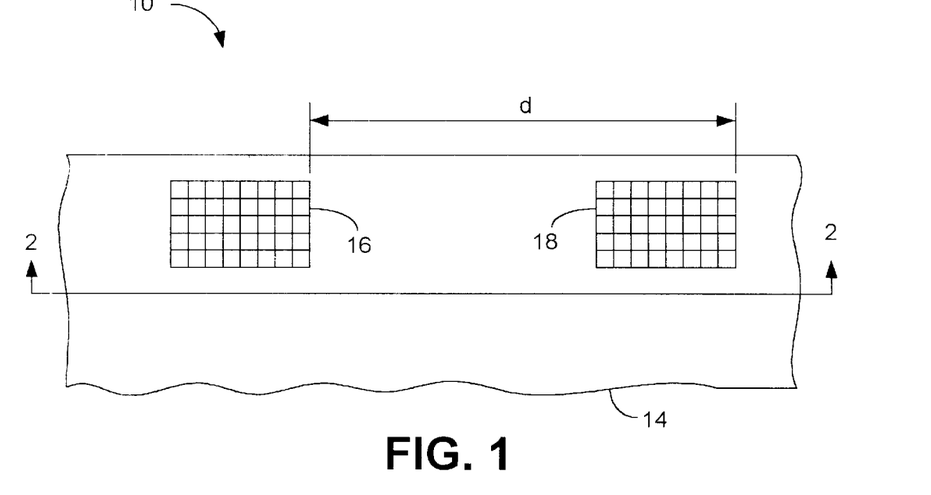
FIG. 1 is a block diagram of a top view showing a portion of a system constructed in accordance with the present invention.
Figure 2:
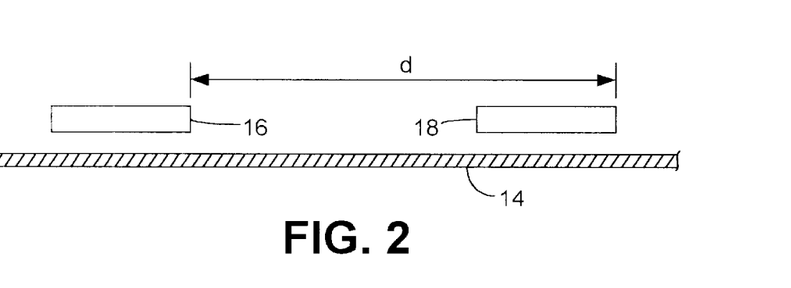
FIG. 2 is a cross-sectional side view of the apparatus of FIG. 1, as taken substantially along line 2—2.

Referring now to the drawings, reference is made to FIGS. 1 and 2, which show a top view (FIG. 1) of a portion of a system 10 constructed in accordance with the invention, and a side view (FIG. 2) as taken substantially along line 2—2 of FIG. 1. As previously mentioned, the present invention is directed to a system 10 for calculating the velocity, displacement and/or strain of a moving web of material 14. In this regard, the strain is proportional to a stretch or shrinkage in the web of material 14. Therefore, the system 10 is designed to accurately measure and calculate such stretch or shrinkage in a moving web of material 14. The primary components of the system of the preferred embodiment include first and second arrays of photosensors 16 and 18, and a processing unit 40 (see FIG. 4).

The structural components illustrated in FIGS. 1 and 2 include the first and second photosensor arrays 16 and 18 positioned above (as illustrated in FIG. 2) the moving web of material 14. Further, the first and second photosensor arrays 16 and 18 are separated by a distance d. In accordance with the preferred embodiment, the photosensor arrays 16 and 18 are two-dimensional arrays containing a plurality of photosensor elements (such as charge-coupled devices CCDs, CMOS devices, or amorphous silicon devices). As will be appreciated by one skilled in the art, and illustrated in FIGS. 8A and 8B, the inventive concepts may be realized by a one-dimensional array of photosensor elements.

In operation, the computation of the strain (e.g., the stretch or shrinkage) of the web of material 14 may be performed in a first embodiment by first evaluating a visible pattern uniquely located at a first location on the web of material 14 and detecting it by the first photosensor array 16 at a first time t1. Then, that same pattern is evaluated at a later time t2 by the second photosensor array 18. Knowing the 15 velocity of the web of material 14 (either through detection or measurement) and the time difference t2–t1, the processing unit 40 can determine whether the pattern, as detected by the second photosensor array 18, is positioned at precisely the location it should be under no strain. If not, the deviation "e" (actual location versus expected location) is measured and taken as the stretch or shrinkage in the web of material 14. On the other hand, if the strain is known to be constant, "e" represents a deviation in displacement caused by a variation in velocity over the time interval t2–t1.

Figure 3:
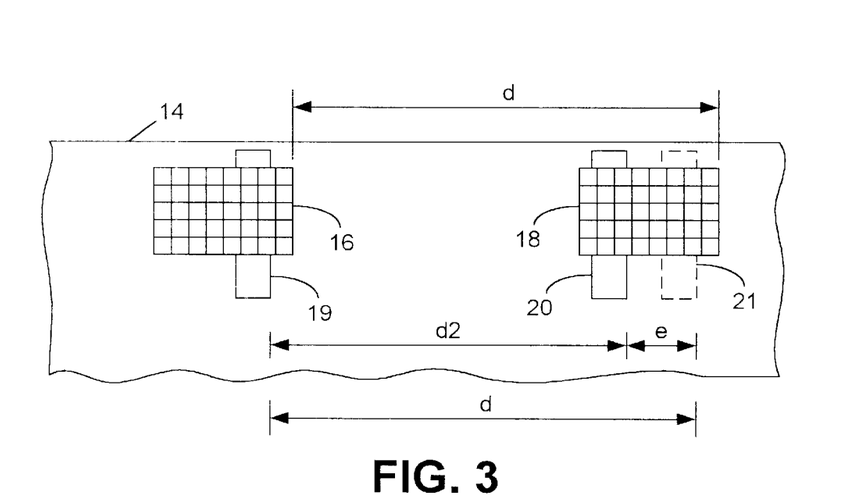
FIG. 3 is a block diagram similar to FIG. 1, but illustrating the acquisition of measurement information from a pattern detected in the web of material.

To illustrate this computation, reference is made to FIG. 3,, which is a top view (like FIG. 1) of the photosensor arrays 16 and 18, further illustrating a detected pattern 19 unique to a specific location on the web of material 14. In this regard, the block denoted by reference numeral 19 illustrates the pattern as observed by the first photosensor array 16, taken at a first time t1. The block designated by reference numeral 20 represents that same pattern as detected by the second photosensor array 18 at a second time t2. The distance "d" illustrates the distance separating the first photosensor array 16 from the second photosensor array 18. The distance d2 represents the distance separating the pattern as detected at time t1 from the location of the pattern as detected at time t2. The box designated by reference numeral 21 and illustrated in dashed lines represents the location that the pattern should have been when detected by the second photosensor array 18 at tine t2 (e.g., a distance "d" from the location of the pattern detected at time t1). Accordingly. the distance "e"represents a deviation in displacement of the pattern, or the stretch/shrinkage of the web of material.

As will be appreciated by persons skilled in the art, the web of material 14 may be a variety of things, depending upon the specific implementation or embodiment of the present invention. For example, the web of material may be a conveyor belt or chain as utilized by the invention and, for example, used in a manufacturing, production, or distribution environment. Alternatively, the web of material 14 may be a sheet of paper when the invention is embodied in systems such as printers, scanners, photocopiers, etc. Indeed, depending upon the specific implementation of the invention, the web of material 14 may be a host of differing materials.

As will further be appreciated by persons skilled in the art, the pattern detected on the web of material 14 may be a created pattern that is preprinted thereon. Alternatively, it may be a pattern that is inherent in the material itself, such as fiber or structural patterns within the material of the web. Alternatively, it could be either a natural or created pattern disposed on an object that is carried on a web of material. For example, in a conveyor environment, the pattern may be detected from cartons or other objects that are carried by the conveyor system. And alternatively, the pattern can be below a surface but visible through the surface.

In the preferred embodiment, the pattern will be a natural material pattern that is detected within the inherent structure-related properties of the web of material. In this regard, "Inherent structure-related properties" are defined herein as properties of the original that are attributable to factors that are independent of forming image data and/or of systematic registration data on the original. Position information may be formed by generating a position signal that is responsive to detection of inherent structure-related properties, such as a position signal of speckle information (under necessary constraints of illumination and viewing angles) or a position signal that permits tracking of individual inherent structural features. "Inherent structural features" are defined herein as those features of an original that are characteristic of processes of its structural design or of forming the original and are independent of forming image data and/or systematic registration data on the original. For example, the inherent structural features may be openings in links of chain or fabric. Or, if the original recorded media is a paper product, the inherent structural features of interest may be paper fibers of microscopic size, e.g., between 1 and 100 $\mu$m, or other features of surface texture.

The photosensors 16 and 18 may include one or more light sources designed to provide contrast dependent upon the inherent structure-related properties of the original. Emitted light may be in the visible range, but this is not essential. For example, "grazing" light that has large angles of incidence relative to the surface normal will interact with paper fibers at or near the surface of an original that is a paper product, creating contrast-enhancing shadows among the fibers. On the other hand, if the original has a glossy surface, such as a photographic print, a plastic-coated or glossy mylar paper or an overhead transparency film, then light reflected in approximately a specular direction may be imaged with high contrast features sufficient for purposes of navigation. Optical elements such as spatial-frequency filters, color filters and/or polarization filters may be used with one or more imaging lenses to further improve detection of inherent structure-related properties.

Figure 4:
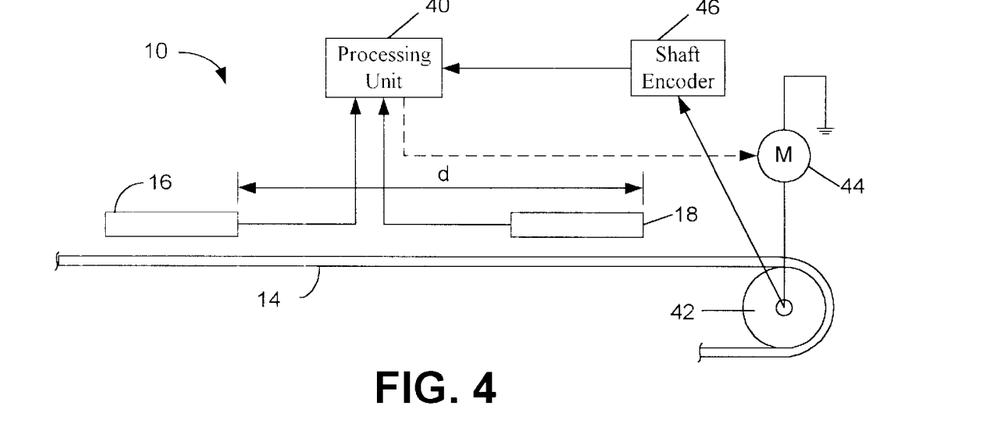
FIG. 4 is block diagram similar to FIG. 2, but illustrating further components of the system.

In keeping with the description of the present invention, reference is now made to FIG. 4 which is a block diagram illustrating the system of the present invention, including a mechanism for moving the web of material 14. In this regard, the web of material 14 is illustrated as being motivated by a drum 42 which rotates about an axis, carrying the web of material therewith. A processing unit 40 carries out the computational operations of the invention. In this regard, the processing unit 40 (which will be described in more detail in connection with FIG. 5) may be a computer, or simply a dedicated circuit and a memory for carrying out computational operations. A motor 44 is disposed to rotate the drum 42, which in turn moves the conveyor or web of material 14. Although not necessary, in one embodiment, the processing unit 40 controls the speed and operation of the motor 44. This optional control is illustrated by a dashed line connecting the processing unit 40 with the motor 44.

In carrying out the operation of the present invention, it is necessary for the processing unit 40 to either measure, assume, or otherwise be informed as to the velocity of the web of material 14. As illustrated in FIG. 4, this velocity information may be provided to the processing unit by means, for example, of a shaft encoder 46 which provides information to the processing unit as to the rotational velocity of the drum 42. From this rotational velocity of the drum, the processing unit 40 can determine the velocity of the web of material. However, in the preferred embodiment more accurate velocity measurements may be acquired by the processing unit as measured from the web of material 14 itself In this regard, a pattern unique to the web of material may be detected by the first photosensor array 16, at a first instance in time. At a later instance in time, shortly thereafter, the first photosensor array 16 may again detect the pattern, but at a different location under the first photosensor array 16. Knowing the time differential between this first and second time instants, and by measuring the displacement between the first and second locations under the first photosensor array 16, the processing unit 40 may accurately calculate the current velocity of the web of material (at the location of the first photosensor array). It may then use this velocity calculation when carrying out the computations as described in connection with FIG. 3 (i.e., when calculating the offset of the pattern when detected by the second photosensor array). Alternatively, velocity can be measured with a similar method using patterns at the second photosensor array 18. In these regards, the system may operate in various ways.

In accordance with a similar but second embodiment, the system may operate simply to continually monitor the second photosensor array to detect the pattern acquired and detected by the first photosensor array. Once this pattern is detected at a location under the second photosensor array, spaced apart by a distance "d" from where the pattern was detected by the first photosensor array 16, the system may use the elapsed time (t2−t1) to calculate the strain "e" of the web of material 14, over the distance "d", as $e=((t2-t1)/v)-d$, where v is independently measured or known and where d is constant.

It will be appreciated from the foregoing that, for purposes of the present invention, what is important for these first two embodiments to measure strain is: (a) that the value of the distance "d" separating the photosensor arrays is fixed and is known; (b) that the velocity of the web of material is known, sensed, or calculated; and (c) that one or more unique patterns are detected on the web of material by the first and second photosensor arrays at various times t1 and t2. As will be appreciated, these values may be utilized in various but related manners in order to measure or compute, in addition to overall displacement, the strain "e" (stretch or shrinkage) of a moving web of material. Thus, there are different ways that these values may be utilized to measure or compute the stretch or shrinkage.

Figure 5:
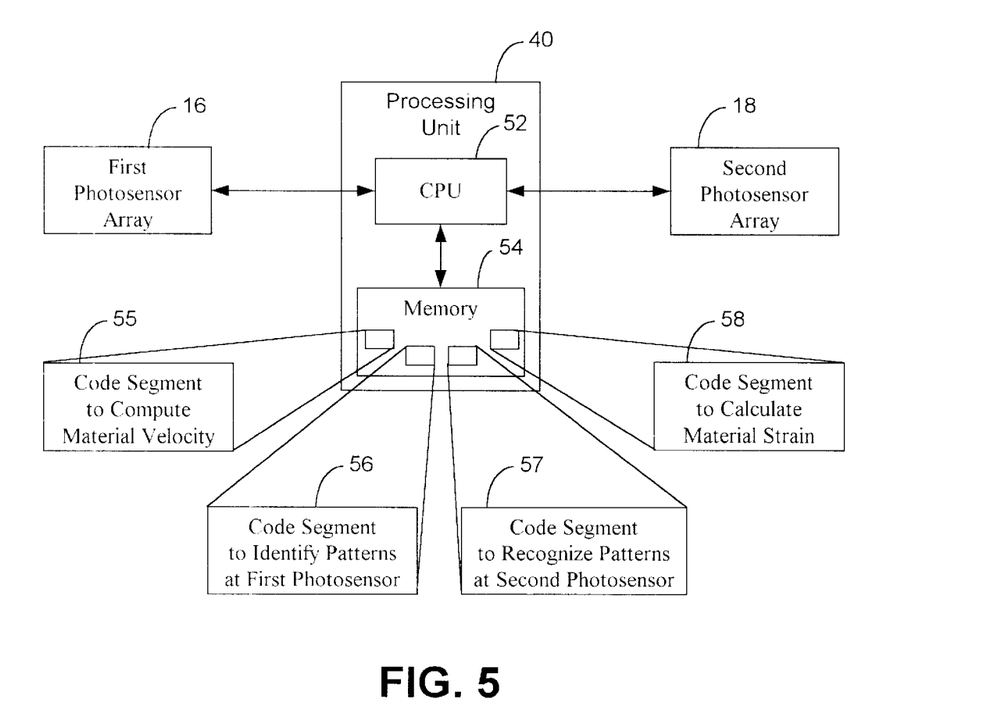
FIG. 5 is a block diagram illustrating the processing unit utilized to carry out computational operations in a system constructed in accordance with the invention.

Reference is now made to FIG. 5, which illustrates in more detail primary components associated with the processing unit 40. Specifically, the processing unit 40 may be implemented in a variety of ways. It is contemplated, however, that the processing, unit 40 will include a central processing unit (CPU) 52, such as a microprocessor, and a memory 54. Within the memory, software, preferably in the form of segments of code, is stored to control the operation of the CPU 52. In this regard, various code segments may be provided to control differing tasks or functions of the CPU 52. For example, a code segment 55 may be provided to compute the velocity of the web of material 14, in a manner described above. A second code segment 56 may be provided to identify patterns on the web of material 14 passing under the first photosensor array 16. Similarly, a code segment 57 may be provided to control the CPU 52 to recognize patterns of material passing under the second photosensor array 18. Further still, a code segment 58 may be provided to determine the displacement of the actual versus anticipated location of the pattern at the second photosensor array 18, and to use this displacement to calculate the stretch or shrinkage of the web of material 14. As will be appreciated, other code segments may be provided for controlling various other aspects of the operation of the CPU 52.

Figure 6:
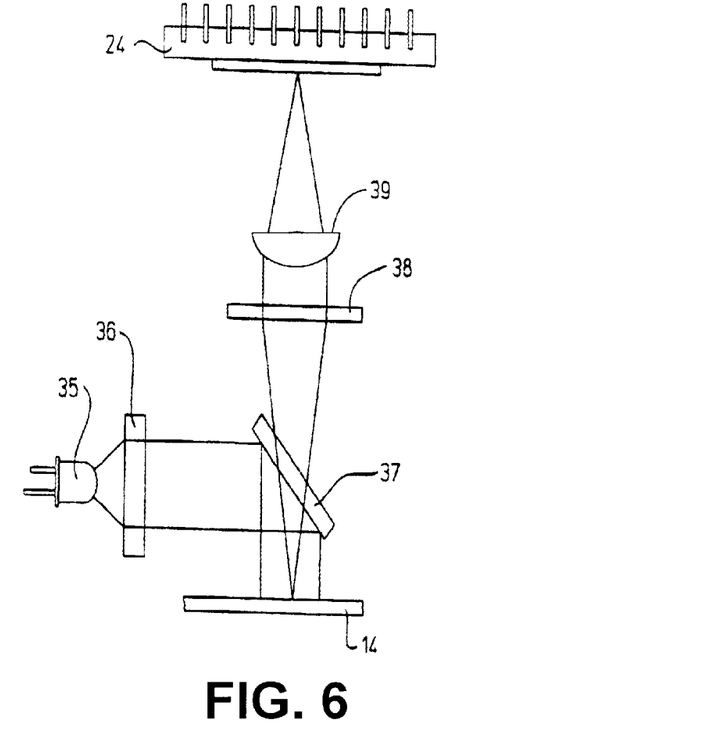
FIG. 6 is a schematic side view of an illumination system that may be used for a photosensor in an array of photosensors, like that illustrated in FIG. 1.
Figure 7:
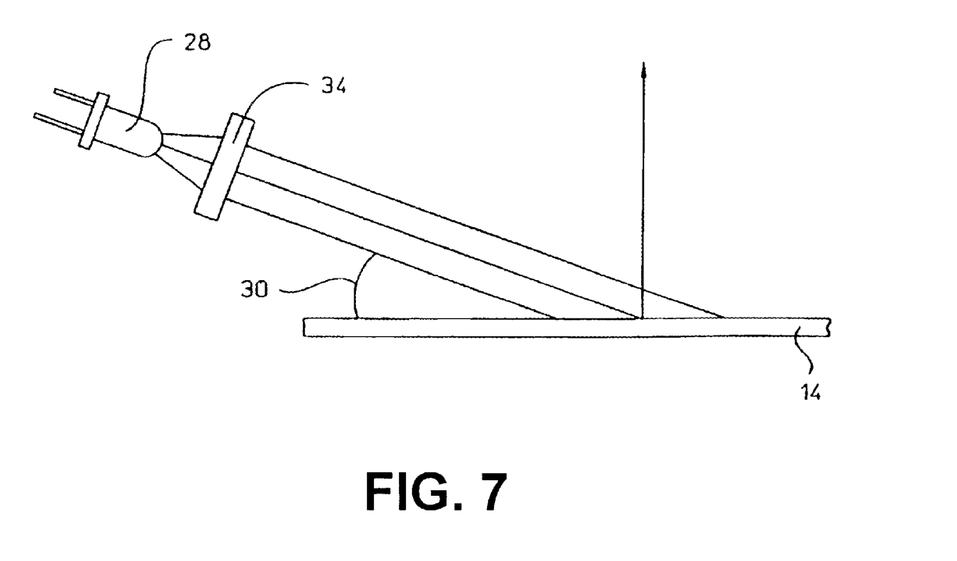
FIG. 7 is a side view of an alternative illumination system.

Referring now to FIGS. 6 and 7, and as disclosed in U.S. Pat. No. 5,578,813, a photosensor 24 (which may comprise the plurality of photosensor elements of array 16 or 18) is shown as being operatively associated with illumination optics. If the web of material 14 is a paper product for which paper fibers are to be detected by the photosensor 24, the introduction of light at a grazing angle of incidence is preferred, as shown in FIG. 7. While not essential, one or more light emitting diodes (LEDs) 35 in FIG. 6 and 28 in FIG. 7 may be used. The grazing angle 30, which is the complement of the angle of incidence, is preferably in the range of below fifteen degrees, but this may change depending upon the properties of the original 14. In FIG. 7, the source 28 is shown with illumination optics 34. The optics may comprise a single element or a combination of lenses, filters (spatial, spectral and/or polarizing) and/or holographic elements to accomplish suitable collimation and generally uniform illumination of the target surface. The wavelength of the light emitted by the source 28 should be selected to enhance the spatial frequency information available for navigation. Fixed pattern noise in the illumination field should be minimized. The output of source 28 may require adjustment to accommodate wide dynamic ranges of reflectivity of the medium as the scanning device proceeds over materials with absorbing or reflecting portions such as printed material with inks or other marking agents.

In FIG. 6, light from a source 35 is collimated at illumination optics 36 and then redirected by an amplitude splitting beamsplitter 37. That portion of the light energy from the LED directly to and transmitted through the beamsplitter is not shown in FIG. 6. The light energy from the beamsplitter illuminates the original 14 along the normal to the surface.

Also represented in FIG. 6 is the portion of the light energy that is reflected or scattered from the original 14 and passed through the beam-splitter 37 for aperturing and filtering at element 38 and focusing to an image by element 39. The portion of light energy passing from the original to the beam-splitter and reflecting from the beam-splitter is not shown. The magnification of the imaging optics 39 should be constant over the field-of-view of the sensor 24 which detects the focused light from the original. In many applications, the modulation transfer functions, i. e. the amplitude measure of optical frequency response, of the imaging optics must be such as to provide attenuation at and above the Nyquist spatial-frequency that is determined by the pitch of the sensor elements of the navigation sensor and by the magnification of the optical elements. The optical elements should also be designed to prevent background illumination from creating noise. Note that a wavefront splitting beam-splitter could also be used.

The selection of the angle of incidence depends upon the material properties of the original. Grazing angles of illumination generate longer and darker shadows and more apparent contrast, or AC/DC signal ratio, if the surface of the original is not glossy. The DC signal level, however, increases as the illumination angle approaches the normal to the original. Illuminating the target region of the original 14 at a grazing angle 30 works well for applications in which the surface of the original has a high degree of unevenness at the microscopic level. For example, the introduction of light from the source 28 at a grazing angle 30 provides a high signal-to-noise ratio of data related to inherent structural features when the original is writing stationary, plain uncoated printing paper, cardboard, fabric, or human skin. On the other hand, the use of incoherent light at a normal angle of incidence may be preferred in applications in which inherent patterns are needed to track movement of such originals as photographs and overhead transparency films. With normal illumination, using incoherent light, viewing the original in the specularly reflected field will provide an image that is sufficiently rich in texture content to allow image and correlation-based navigation. The surface of the original has a microscopic relief such that the surface reflects light as if the surface were a mosaic of tiles, or facets. Many of the "tiles" of an original reflect light in directions slightly perturbed from the normal. A field-of-view that includes the scattered light and the specularly reflected light can thus be modeled as though the surface were composed of many such tiles, each tilted somewhat differently with respect to the normal.

FIG. 6 shows illumination by a source 35 of incoherent light, which is directed along the normal of the surface of the original 14. FIG. 7 describes illumination at a grazing angle 30. In a third embodiment, no illumination is provided. Instead, the navigation information is accumulated using background light, i. e., light from the environment. One skilled in the art can readily appreciate that transparent web materials could be illuminated by light from the opposite side and that light emitting surfaces or web materials would need no other illumination than their own.

In an alternative embodiment, coherent illumination is introduced at normal incidence to permit correlation of speckle-based patterns. Relative motion between one or more photosensor arrays and a web of material may be accomplished in manners described above for natural or man-made patterns. If coherent illumination is used without using imaging optics, then by selecting a small area of illumination and by having a relatively large separation between the surface of the original and the photodetector array of the sensor 24, the resulting predominant speckle cell sizes with coherent illumination can be made sufficiently large to satisfy the Nyquist sampling criterion. The use of a beam splitter allows the direction of both the incident illumination and the detected scatter to be near to normal to the surface of the original, as similarly accomplished in FIG. 4.

Figure 8A:
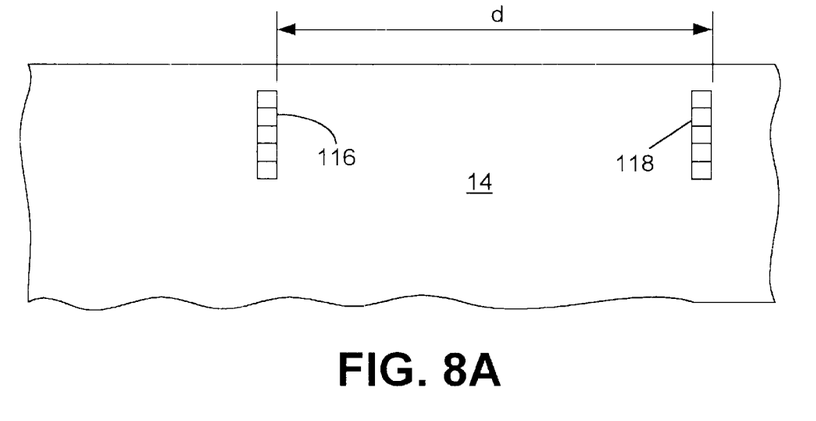
FIG. 8A is a block diagram of a system similar to that illustrated in FIG. 1, but illustrating an alternative embodiment thereof.
Figure 8B:
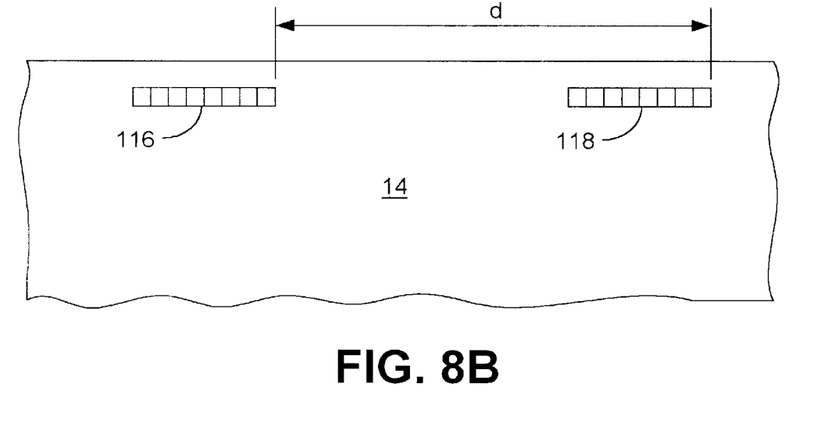
FIG. 8B is yet a further embodiment of a system like that illustrated in FIG. 1.

Reference is now made briefly to FIGS. 8A and 8B, which illustrate alternative embodiments of the present invention. Specifically, the photosensor arrays 16 and 18 illustrated and described in connection with previous figures, are two-dimensional photosensor arrays. However, the invention may be implemented using one-dimensional photosensor arrays 116 and 118. In this regard, a plurality of photosensors will be disposed in a single column or row form. The arrays of photosensors 116 and 118 may be disposed in a perpendicular relationship to the movement of the web of material 14 as illustrated in FIG. 8A, or they may be oriented in a parallel relationship to the movement of the web of material 14, as illustrated in FIG. 8B. Alternatively, the photosensor arrays 116 and 118 may be disposed at an oblique angle (not shown) that is intermediate to the dispositions illustrated in FIGS. 8A or 8B. The advantage of a one-dimensional array of photosensors as illustrated in FIGS. 8A and 8B is that it simplifies the implementation and computation associated with the present invention. However, the disadvantage of such an embodiment is that it limits the redundancy and greater uniqueness otherwise found of larger image patterns which may otherwise be detected, and when the lengths of one-dimensional arrays are aligned parallel to the direction of travel of the web of material, there may be less tolerance for deviations in the position of patterns when the deviations are transverse to the direction of travel of the web of material.

Figure 9:
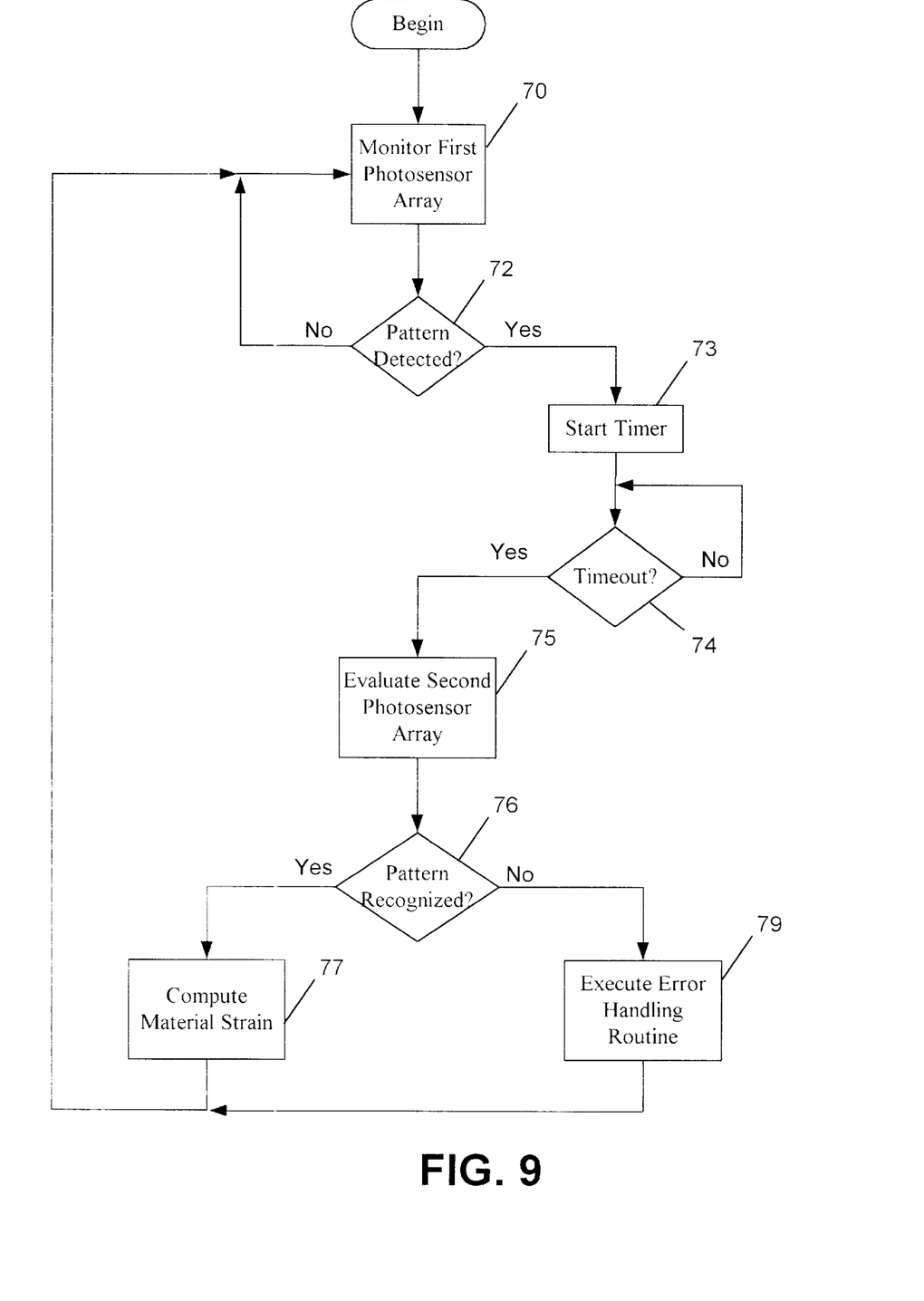
FIG. 9 is a flowchart illustrating the top-level functional operation of one embodiment of the present invention.

Reference is now made to FIG. 9 which is a flowchart illustrating the top level operation of the first embodiment of the present invention. In this first embodiment, the invention operates to monitor the first photosensor array 16 until a pattern is detected (Steps 70 and 72). Once the pattern is detected, then a timer is started (Step 73), and the system waits for a predetermined period of time (Step 74), after which the detected pattern should be disposed at a predetermined location beneath the second photosensor array 18. The second photosensor is then evaluated to determine whether the pattern is recognized thereunder (Steps 75 and 76). If the pattern is in fact recognized, then the system measures a displacement "e" (by correlation or heuristic techniques) from the anticipated predetermined location in order to determine the net displacement and the material strain (i. e., stretch or shrinkage) of the web of material (Step 77) over the distance "d". If, however, the pattern is not recognized under the second photosensor array 18, then an appropriate error handling routine will be executed (Step 79).

Figure 10:
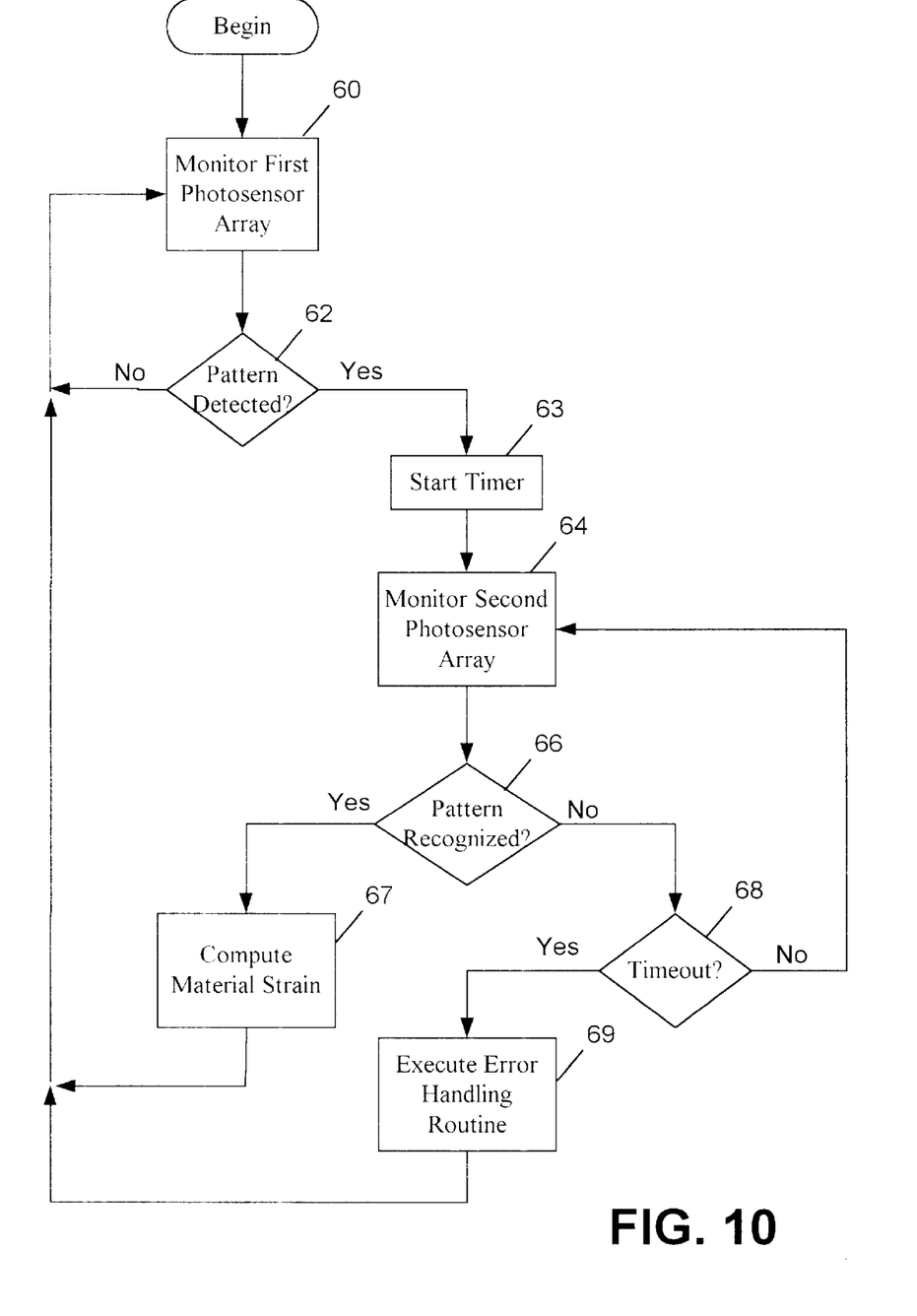
FIG. 10 is a flowchart illustrating the top-level functional operation of an alternative embodiment of the present invention.

Reference is now made to FIG. 10 which is a flowchart illustrating the second embodiment of the present invention. In this second embodiment, the invention may operate by monitoring the first photosensor array 16 until a definable pattern is detected (Steps 60 and 62). In this regard, the embodiment may monitor the first photosensor array for a predetermined pattern, or may simply monitor the array until it detects an inherent pattern that will statistically ensure uniqueness. In this regard, the pattern may comprise a detected arrangement of various fibers within the web of material that, statistically, is very unlikely to be repeated. Therefore, false detection by the second photosensor array is avoided. Once the pattern is detected, the system may start a timer (at Step 63). Thereafter, the system may monitor continually the second photosensor array 18 and measure the elapsed time t2−t1 until the pattern is recognized (Steps 64 and 66). Once the duration t2−t1 is determined a web displacement of "d" is thereby detected, and strain computation may be performed, in a manner previously discussed (Step 67), wherein the strain "e" over the distance "d" is determined as e=((t2−t1)/v)−d. If a predetermined period of time significantly longer than d/v passes before the pattern is recognized (Step 68), then the system may be configured to time out and execute an error handling routine (Step 69). This error handling routine may simply comprise clearing out the detected pattern and proceeding to Step 60. In this respect, if the invention is implemented in a conveyor transport environment, occasional errors may simply be ignored without effecting the overall operation of the system. In yet other systems, such as opto-electronic scanners, ink jet printers, etc., then such errors may not simply be ignored and therefore an appropriate error handling routine (Step 69) must be implemented. The specific routine, however, may vary from system to system, and is not important for purposes of implementing the concepts of the present invention. For this reason, details about error handling routines need not be discussed herein.

Implicit within the flowchart of FIGS. 9 and 10 is the computation or knowledge regarding the velocity at which the web of material 14 is moving. In this regard, the velocity may be calculated as described above, or may be detected using a shaft encoder or it may otherwise be supplied to the processing unit 40. This information is implicit to the computation of the strain of material (Step 67). Alternatively, in these first and second embodiments, if strain is known to be unchanging, then the measurements of "e" and t2–t1, respectively, may be used to compute average velocity over the distance "d".

A third embodiment avoids the need to use velocity information in the determination of strain. Further, if all the individual patterns used on the web of material are unique, one from the other, absolute displacements measurements may be made in increments of "d". This third embodiment relies on unique patterns being repeated at intervals of separation equal to "d" along the direction of travel of the web. In this implementation, when the first photosensor array detects one of these patterns, the second photosensor array is used to determine the position of a neighboring pattern at its location, a distance "d" from the first photosensor array. Variation in the location of the second pattern relative to the first pattern is compared to what would be expected if the material were not strained, to determine a measurement of strain.

In yet a fourth embodiment of the invention, patterns are tracked by a first photosensor array 16 to obtain web velocity at that location, while patterns are simultaneously tracked at a second photosensor array 18, at its location a distance "d" away from the first photosensor array 16, to effect independent determinations of velocity at two displaced locations. By comparing these two velocity values, the rate of change of strain in a web of material can be measured along the distance "d", and if it is known otherwise that strain is constant over this distance, the change in length of the material between the two photosensor array locations can be determined. In the latter case, this would be useful in take-up loops in conveyor systems or tape drives.

The methods of this invention recognize that more precise and accurate velocity, displacement and strain measurements may be made as the distance "d" is made larger. Prior art shaft encoder techniques typically have precisions (and accuracies accumulated over many revolutions) that are limited by their circumference dimensions, while linear encoder techniques have precisions limited by the relatively small dimensions of their sensor heads and accuracies limited by strain, including thermal expansions.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for calculating strain of a moving web of material comprising:
   a first photosensor array disposed near the web of material,
   a second photosensor array disposed near the web of material and separated from the first photosensor array by a predetermined distance d, the separation distance "d" being parallel to a direction of travel of the moving web of of material;
   a processing unit coupled to both the first photosensor array and the second photosensor array;
   a first code segment configured to control the processing unit to detect a pattern on the web of material at the first photosensor array;
   second code segment configured to control the processing unit to recognize the detected pattern on the web of material at the second photosensor array; and
   a third code segment configured to control the processing unit to calculate the strain on the web of material based on the velocity of the web of material, the distance d, and an elapsed time between the detection of the pattern in response to the first code segment and the recognition of the pattern in response to the second code segment.

2. The system as defined in claim 1, wherein the web of material is one selected from the group consisting of: a conveyor belt; a piece of paper; a piece of metal; and a piece of plastic.

3. The system as defined in claim 1, wherein the web of material includes preprinted markings disposed to be detected by the first and second photosensor arrays.

4. The system as defined in claim 1, wherein the detected pattern is a natural pattern existing in the web of material, the web of material not having any preprinted markings thereon.

5. The system as defined in claim 1, wherein the first and second photosensor arrays are two dimensional photosensor arrays, having a plurality of sensor elements in each of two dimensions.

6. The system as defined in claim 1, wherein the first and second photosensor arrays are columnar photosensor arrays, having a plurality of sensor elements in one dimension, and only a single column of sensor elements in a second dimension perpendicular to the first dimension.

7. The system as defined in claim 1, wherein the processing unit includes at least a processor and a memory, and wherein the plurality of code segments reside in the memory.

8. The system as defined in claim 1, wherein the calculated strain is proportional to a stretch of the web of material.

9. The system as defined in claim 1, wherein the calculated strain is proportional to a shrinkage of the web of material.

10. The system as defined in claim 1, further including a fourth code segment configured to control the processing unit to determine a velocity of the web of material.

11. The system as defined in claim 10, wherein the fourth code segment controls the processing unit to evaluate an output from the first photosensor array in two successive time instants, closely spaced in time, to quantify movement of a detected pattern.

12. The system as defined in claim 11, wherein the fourth code segment further controls the processing unit to evaluate an output from the second photosensor array in two successive time instants, closely spaced in time, to quantify movement of a detected pattern.

13. The system as defined in claim 1, further including a sensor for determining the velocity of the web of material.

14. The system as defined in claim 13, wherein the sensor includes a shaft encoder coupled to a shaft that is coupled to the web of material to rotate as the web of material moves.

15. The system as defined in claim 1, wherein the first and second photosensor arrays are disposed parallel and substantially adjacent to the web of material, defining only a small clearance space therebetween.

16. A system for measuring pattern displacements on a moving web of material comprising:
   a first photosensor array disposed near the web of material;
   a second photosensor array disposed near the web of material and separated from the first photosensor array by a predetermined distance d, the separation distance "d" being parallel to a direction of travel of the moving web of material;
   a processing unit coupled to both the first photosensor array and the second photosensor array;
   a first code segment configured to control the processing unit to evaluate a first image pattern at the first photosensor array at a first predetermined time t1 to detect a first image pattern;
   a second code segment configured to control the processing unit to evaluate a second image pattern at the second photosensor array at a second predetermined time t2 and correlate the second image pattern with the first image pattern; and
   a third code segment configured to control the processing unit to determine an offset of the second image pattern from the first image pattern.

17. The system as defined in claim 16, wherein the offset represents a measure of strain that is proportional to a shrinkage of the web of material.

18. The system as defined in claim 16, wherein the offset represents a measure of strain that is proportional to a stretch of the web of material.

19. The system as defined in claim 16, wherein the offset represents a measure of velocity error from an assumed or target velocity.

20. The system as defined in claim 16, further including a fourth code segment configured to control the processing unit to determine a velocity of the web of material.

21. The system as defined in claim 20, wherein the fourth code segment further controls the processing unit to evaluate an output from the first photosensor array in two successive time instants, closely spaced in time, to quantify movement of a detected pattern.

22. The system as defined in claim 20, wherein the fourth code segment further controls the processing unit to evaluate an output from the second photosensor array in two successive time instants, closely spaced in time, to quantify movement of a detected pattern.

23. A method for measuring a strain on a web of material moving at a velocity v comprising the steps of:
   disposing a first photosensor array along the web of material at a first location;
   disposing a second photosensor array along the web of material at a second location at a distance "d" from the first photosensor array;
   evaluating a first image pattern at the first photosensor array at a first predetermined time t1 to detect a first image pattern;
   evaluating a second image pattern at the second photosensor array at a second predetermined time t2, wherein $v*(t2-t1)$ is substantially equal to d;
   correlating the second image pattern with the first image pattern; and
   calculating an offset "e" of the second image pattern from the first image pattern.

24. The method as defined in claim 23, wherein $v*(t2-t1)=d$.

25. The method as defined in claim 23, wherein the calculated offset is proportional to the strain of the web of material.

26. The method as defined in claim 23, wherein the calculated offset is proportional to a velocity variation of the web of material.

27. The method as defined in claim 23, further including the step of determining the velocity v of the web of material.

28. The method as defined in claim 27, wherein the step of determining the velocity includes evaluating an output from the first photosensor array in two successive time instants, closely spaced in time, to quantify movement of a detected pattern.

29. The method as defined in claim 28, wherein the step of determining the velocity further includes evaluating an output from the second photosensor array in two successive time instants, closely spaced in time, to quantify movement of a detected pattern.

30. The method as defined in claim 27, wherein the step of determining the velocity includes monitoring a sensor that generates an output signal that is proportional to the velocity v of the web of material.

31. The method as defined in claim 27, wherein the sensor is a shaft encoder.

32. A method for measuring a strain on a web of material moving at a velocity v comprising the steps of:
   disposing a first photosensor array along the web of material at a first location;
   disposing a second photosensor array along the web of material at a second location at a distance "d" from the first photosensor array;
   evaluating a first image pattern at the first photosensor array to detect a first image pattern;
   monitoring a second image pattern at the second photosensor array continually until the detected first image pattern is recognized;
   measuring the time t elapsed between the detection of the first image pattern at the first photosensor and the recognition of the first image pattern at the second photosensor array;
   calculating an offset "e" of the second image pattern from the first image pattern, wherein the offset is equal to $v*t-d$.

33. A system for measuring a strain on a moving web of material comprising:
   first means for detecting a first image pattern on the web of material at a first location;
   second means for detecting a second image pattern of the web of material at a second location, the second location being spaced a distance "d" from the first location;
   determining means for determining the velocity v of the web of material;
   correlating means for correlating the first image pattern detected at a time t1 and the second image pattern detected at a time t2; and
   computing means responsive to the correlating means for computing an offset e.

34. The system as defined in claim 33, wherein the correlating means is configured to evaluate the second image pattern at a predetermined time t2, and compute the offset "e" based upon pattern recognition techniques.

35. The system as defined in claim 34, wherein v*(t2−t1)=d.

36. The system as defined in claim 33, wherein the correlating means is configured to continually evaluate the second image pattern and measure a time difference t2−t1, upon recognition of the detected first image pattern at the second photosensor array, and compute the offset "e" as being equal to v*(t2−t1)−d.

37. The system as defined in claim 33, wherein the calculated offset "e" is proportional to the strain of the web of material.

38. The system as defined in claim 33, wherein the calculated offset "e" is proportional to the velocity variation between t1 and t2.

39. A system for calculating strain of a web of material comprising:
- a web of material having a plurality of image patterns thereon, wherein each of the plurality of image patterns are separated by a distance "d";
- a first photosensor array disposed near the web of material;
- a second photosensor array disposed near the web of material and separated from the first photosensor array by a predetermined distance "d", the separation distance "d" being parallel to a direction of strain of the web of material;
- a processing unit coupled to both the first photosensor array and the second photosensor array;
- a first code segment configured to control the processing unit to detect an image pattern on the web of material at the first photosensor array;
- a second code segment configured to control the processing unit to recognize an image pattern on the web of material near the second photosensor array; and
- a third code segment configured to correlate the pattern recognized at the second photosensor array and compute any offset from an expected position of the pattern and the actual position of the pattern, wherein this offset is proportional to the strain of the web of material.

40. A method for calculating strain of a web of material comprising:
- disposing a plurality of image patterns on the web of material, wherein each of the plurality of image patterns are separated by a distance "d";
- disposing a first photosensor array near the web of material;
- disposing a second photosensor array near the web of material at a predetermined distance "d" away from the first photosensor array;
- controlling a processing unit to detect an image pattern on the web of material at the first photosensor array;
- controlling the processing unit to recognize an image pattern on the web of material near the second photosensor array; and
- correlating the pattern recognized at the second photosensor array and compute any offset from an expected position of the pattern and the actual position of the pattern, wherein this offset is proportional to the strain of the web of material.

41. A system for measuring increments of displacement of a moving web of material comprising:
- a first photosensor array disposed near the web of material;
- a second photosensor array disposed near the web of material and separated from the first photosensor array by a predetermined distance d, the separation distance "d" being parallel to a direction of travel of the moving web of material;
- a processing unit coupled to both the first photosensor array and the second photosensor array;
- a first code segment configured to control the processing unit to detect a pattern on the web of material at the first photosensor array;
- a second code segment configured to control the processing unit to recognize the detected pattern on the web of material at the second photosensor array; and
- a third code segment configured to control the processing unit to calculate an offset "e" of the pattern, from a displacement of "d", assuming no stretch or shrinkage in the web of material.

42. The system as defined in claim 41, wherein the distance "d" is larger than a lateral dimension of either the first photosensor array or the second photosensor array in the direction of web travel.

43. The system as defined in claim 41, wherein the pattern is disposed on an object that is carried on the web of material.

44. The system as defined in claim 41, wherein at least one of the first and second photosensor arrays includes projection optics to facilitate obtaining an image pattern from the web of material.

45. The system as defined in claim 41, wherein at least one of the first and second photosensor arrays includes imaging optics to facilitate obtaining an image pattern from the web of material.

* * * * *